G. W. LEE.
Thrashing Machine.
No. 105,344. Fig. 1. Patented July 12, 1870.
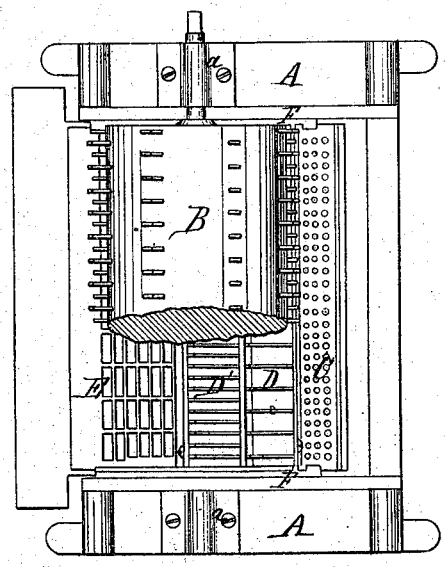
Fig. 2.
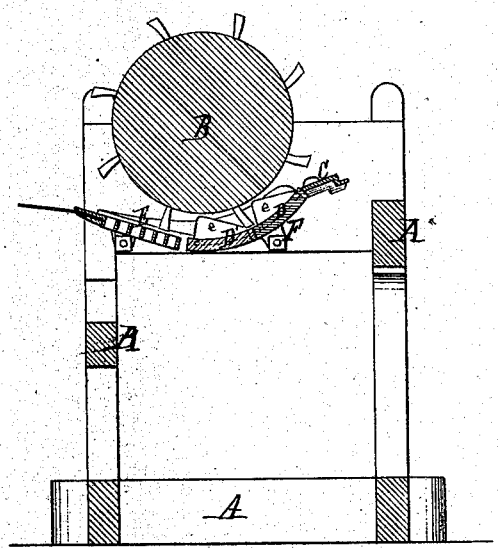
Fig. 3.
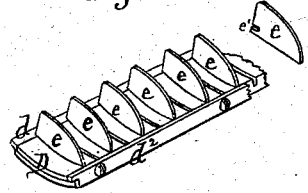
Witnesses.
Alex Mahon
N. B. Smith
George W Lee
by his Attorney
Addison M. Smith

United States Patent Office.

GEORGE W. LEE, OF HOMEWORTH, ASSIGNOR TO HIMSELF AND C. AULTMAN, OF CANTON, OHIO.

Letters Patent No. 105,344, dated July 12, 1870.

IMPROVEMENT IN THRASHING-MACHINE.

The Schedule referred to in these Letters Patent and making part of the same.

*To all whom it may concern:*

Be it known that I, GEORGE W. LEE, of Homeworth, Columbiana county, State of Ohio, have invented certain new and useful Improvements in Thrashing-Machines, or Thrasher-Concaves, of which the following is a full, clear, and exact description, reference being had to the accompanying drawing making a part of this specification, in which—

Figure 1 is a plan or top view of the machine, with a portion of the cylinder broken away to show the concave;

Figure 2 is a vertical section on line $y\ y$ fig. 1; and

Figure 3 represents a portion of one of the toothed sections of the concave, and, also, one of the teeth detached.

Similar letters of reference denote corresponding parts in all the figures.

My invention consists in a novel construction of the teeth of the concave, whereby they are adapted to allow the passage of the grain or straw with the least possible obstruction consistent with the object to be attained, viz., the thorough thrashing out of the grain in such manner as to avoid the usual cutting or tearing to pieces, and consequent destruction of the straw, and, at the same time, enabling me to drive the machine with less power than has heretofore been required.

It also consists in the manner of combining said teeth with the concave or the sections thereof, whereby they are adapted to be readily removed and replaced when broken or for other purposes, as will be described.

In the annexed drawing—

A represents an upright frame-work, in bearings, $a\ a$, in the upper portion of which is mounted a horizontal shaft carrying the thrashing-drum or cylinder B, all of which may be of any usual or desired construction.

Directly underneath the cylinder B is arranged the thrasher-concave, composed, in this instance, of feed-apron, C, toothed sections, D D', and screen or delivery-apron or tail-plate, E, fitting in and made removable from adjustable grooved side plates F.

The toothed sections D D' are grooved at regular intervals on their inner concave faces, to receive the teeth $e$, said grooves extending across the sections and terminating at one end against an inclined or L-shaped flange or lip, $d$, formed upon or firmly secured to one edge of the section.

These grooves are open at one end to permit the insertion of teeth, $e$, which are made triangular in form, substantially as represented in fig. 3, detached.

The inclined upper face of these teeth, or that which acts on the grain, is, by preference, made slightly convex or arching, and the rear upright face is notched, as shown at $e'$, or otherwise adapted to engage with and be held by the flange or lip $d$ on the sections D D'. After the teeth have been properly inserted, a bar, $d'$, placed over the open ends of the grooves and firmly attached to the tooth-plates or sections, prevents the accidental withdrawal or displacement of the teeth. The teeth, constructed and secured in place in the sections as described, when arranged in the concave, assume a relation to the cylinder substantially such as is shown in fig. 2, that is to say, with the inclined sides or edges facing the incoming grain, and with the highest point or apex of the tooth rising into close proximity with the cylinder B, so as effectually to prevent the grain from escaping unacted upon, while the gradual incline of the faces of the teeth which act upon the grain, and over which the grain rides, prevents the tearing or cutting of the straw incident to the employment of the interlocking teeth of the concave and cylinder, as heretofore ordinarily constructed.

It will be apparent from the foregoing that, while the grain is as effectually operated upon, the avoidance of the tearing or breaking to pieces of the straw, and the consequent gentler or less abrupt action of the teeth, will enable the machine to be driven with much less power than machines of ordinary construction.

Having now described my invention,

What I claim as new, and desire to secure by Letters Patent, is—

1. In combination with the grooved concave sections D, the removable teeth $e$, when constructed as described, and arranged to operate relatively to the thrashing-cylinder, substantially as shown.

2. In combination with the grooved concave sections D, and removable teeth $e$, the flange $d$, and bar $d'$, substantially as and for the purpose described.

Witnesses:                                       GEORGE W. LEE.
  JOSHUA LEE,
  S. A. T. LEE.